US006280233B1

(12) United States Patent
Beege et al.

(10) Patent No.: US 6,280,233 B1
(45) Date of Patent: Aug. 28, 2001

(54) RESILIENT CONTACT FOR ELECTRICAL CONDUCTORS

(75) Inventors: Werner Beege, Hainburg; Werner Radde, Babenhausen; Manfred Domrath, Weener; Reinhard Ruhm, Pfungstadt; Klaus Steinmetz, Flörsheim, all of (DE)

(73) Assignee: Weidmüller Interface GmbH & Co., Detmold (DE)

(*) Notice: Subject to any disclaimer, the term of this patent is extended or adjusted under 35 U.S.C. 154(b) by 0 days.

(21) Appl. No.: 09/655,345

(22) Filed: Sep. 5, 2000

(30) Foreign Application Priority Data

Sep. 3, 1999 (DE) .......................................... 299 15 512 U

(51) Int. Cl.[7] .................................................... A01R 11/20

(52) U.S. Cl. ............................................................ 439/441

(58) Field of Search .................................... 439/441, 435, 439/437, 440, 828, 834, 835, 436

(56) References Cited

U.S. PATENT DOCUMENTS 5,445,528 * 8/1995 Frantz .................................. 439/441
5,454,730 * 10/1995 Tonzuka ............................... 439/441
5,684,735 * 11/1997 Hohorst ................................ 439/441
5,876,237 * 3/1999 Patel et al. ........................... 439/441
5,975,940 * 6/2000 Hartmann et al. ................... 439/441

FOREIGN PATENT DOCUMENTS 2062158 4/1979 (DE) .
2802269 4/1989 (DE) .

* cited by examiner

*Primary Examiner*—Renee Leubke
*Assistant Examiner*—Felix O. Figueroa
(74) *Attorney, Agent, or Firm*—Laubscher & Laubscher

(57) ABSTRACT

An electrical connector includes a housing formed of electrical insulating material containing a chamber in which is mounted a resilient clamping member that biases a conductor into electrical engagement with an electrical contact also contained within the chamber. The bare end of the conductor is inserted into the chamber via a first housing opening, and the clamping member is operated to a released condition relative to the conductor by a release tool that is inserted into the chamber via a second housing opening. The clamping member includes a clamping leg having a laterally offset terminal portion that carries a clamping edge adapted to dig into the conductor and thereby retain the same within the chamber. The clamping member also includes a support leg that is operable by the release tool to displace the clamping leg to disengage the clamping edge from the conductor, thereby to release the same for withdrawal from the chamber.

13 Claims, 3 Drawing Sheets

FIG. 3
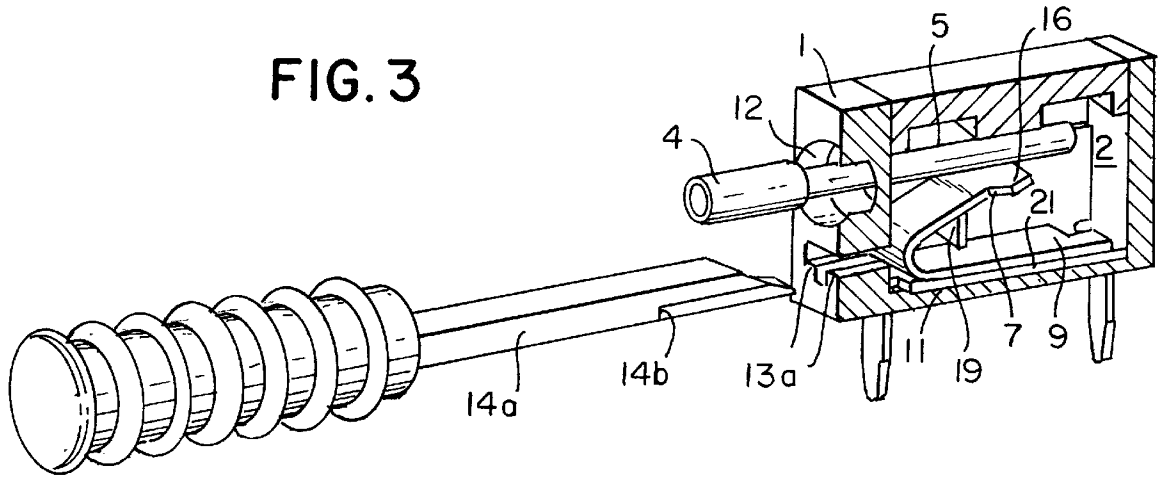
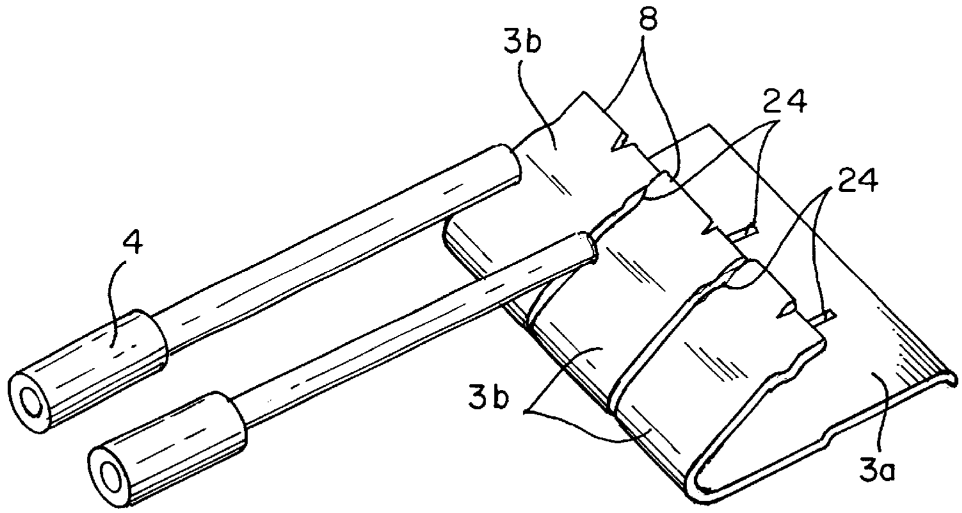
FIG. 4

RESILIENT CONTACT FOR ELECTRICAL CONDUCTORS

FIELD OF THE INVENTION

This invention relates to an electrical connector that includes a resilient clamping member having a clamping leg that biases a conductor laterally into electrical engagement with a stationary contact, and a support leg that is operable by a release tool to disengage the clamping leg from the conductor. The clamping leg has a clamping edge adapted to dig into the periphery of the conductor, thereby to resist withdrawal of the conductor from engagement with the contact.

BACKGROUND OF THE INVENTION

BRIEF DESCRIPTION OF THE PRIOR ART

As evidenced by the German patent No. DE 2802269, it has been proposed in the prior art to provide a resilient electrical contact having a clamping edge that is directed toward the periphery of a conductor, thereby to engage the same to prevent withdrawal of the conductor from the housing within which the contact is mounted. The clamping leg is adapted to be displaced toward a released position relative to the conductor by an operating tool. This arrangement possesses the drawback of the possibility of damage to the conductor by the clamping edge during the withdrawal of the conductor from the contact housing. Furthermore, the clamping member has a rather complicated structure owing to the requirement of a special activation bracket and because, in the front region of the connector chamber, a separate access opening is required through which the activation tool is inserted during movement toward the activation bracket.

On the other hand, as proposed in the German patent No. 2062158, the free end of the clamping leg may be bent slightly in an attempt to avoid damage to conductor during its withdrawal from the contact housing. This structure has the drawback that the activating portions are provided on the contact leg itself for lateral activation or for activation from above, thereby complicating the contact design but also, in the case of lateral arrangement, makes the provision of multi-row design impossible.

The present invention was developed to avoid the above and other drawbacks of the known connection art.

SUMMARY OF THE INVENTION

Accordingly, it is a primary object of the present invention to provide a resilient connector that is positively and reliably operable to release the conductor for damage free withdrawal from the contact housing, characterized in that the clamping leg of the clamping member is operable by a release tool toward a released position in which an offset terminal portion of the clamping leg that carries the clamping edge is no longer directed toward the conductor, whereby withdraw of the conductor is unhindered, and damage to the conductor is avoided.

According to another object of the invention, the release tool is operable to engage the support leg of the resilient clamping member to displace the clamping leg toward the released position relative to the conductor, thereby to avoid damage to, and permanent undesirable deformation of the clamping leg portion of the resilient clamping member.

A further object of the invention is to provide the clamping leg of the clamping member with an offset terminal portion that carries the clamping edge, whereby when in the disengaged position, the offset portion is parallel with and spaced from the conductor.

Another object of the invention is to design the portion of the support leg adjacent the juncture between the support and clamping legs for engagement by a release tool having an oblique activating surface, orientation means being provided for assuring that the release tool has the proper orientation about its longitudinal axis relative to the surface of the support leg which it is to engage. Stop means may be provided on the resilient clamping member and/or the housing to limit the extent of angular displacement of the clamping leg relative to the support leg, thereby to avoid overload and permanent undesirable deformation of the clamping member.

BRIEF DESCRIPTION OF THE DRAWINGS

Other objects and advantages of the invention will become apparent from a study of the following specification, when viewed in the light of the accompanying drawings, in which:

FIG. 3 is a perspective view of another embodiment of the electrical connector arrangement of the present invention; and FIG. 4 is a perspective view illustrating a clamping spring arrangement having a plurality of clamping leg portions and a common integral support portion.

DETAILED DESCRIPTION

Figures 1A, 1B, 1C:
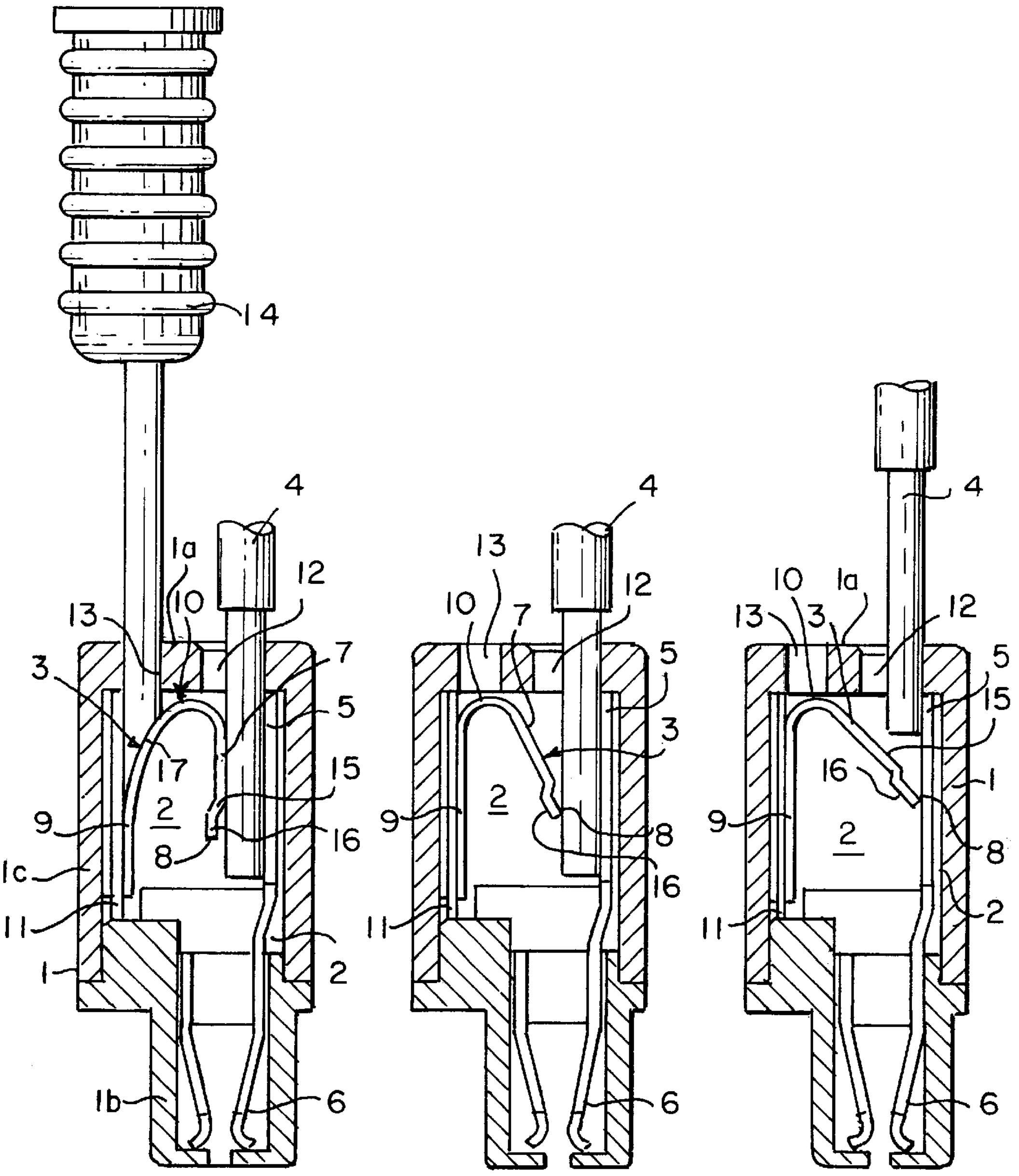
FIGS. 1A–1C illustrate a first embodiment of the invention wherein the clamping spring is in its released, engaged, and fully extended positions, respectively.

Referring first more particularly to FIGS. 1A–1C, the electrical connector of the present invention includes a housing 1 that is formed from electrical insulating material and contains a chamber 2 in which is mounted a generally V-shaped resilient clamping member or spring 3 that is operable to bias an electrical conductor 4 laterally into electrical engagement with the bus bar portion 5 of a female electrical contact 6. The resilient clamping spring 3 includes a support leg portion 9 that is supported by a support plate 11 adjacent one wall of the chamber 2, and a clamping leg portion 7 that is biased toward an extended position adjacent the bus bar 5, as shown in FIG. 1C. According to the present invention, the clamping leg portion 7 has at its free end a terminal portion that is connected with the clamping leg portion by a double-bent intermediate portion 15. The terminal portion 15 terminates in a clamping edge 8, said terminal portion being generally parallel with said clamping leg and offset in the direction of said support leg. The housing end wall 1*a* contains a first opening 12 through which the bare end of the insulated conductor 4 is introduced, whereupon the conductor extends between the clamping leg 7 and the bus bar 5 as shown in FIG. 1B. When the clamping leg 7 is in this engaged position, the clamping edge 8 at the free extremity of the clamping leg is engagement with, and digs into the outer periphery of, the bare end of conductor 4, thereby to resist withdrawal of the conductor from the chamber 2.

In accordance with a characterizing feature of the invention, the housing end wall 1*a* contains a second opening 13 opposite the support leg 9 of the clamping spring 3, whereby the operating end of a release tool 14 may be introduced into the housing chamber 2. As best shown in FIG. 1A, the end of the release tool 14 has an oblique end surface 17 that is adapted to engage the support leg 9 and to displace the junction 10 between the support and clamping legs toward the bus bar 5, whereby the clamping spring is deformed toward the released position in which the clamping leg portion 7 is generally parallel with the conductor 4, and the clamping edge 8 is in an offset released position spaced from the conductor 4, whereupon the conductor may be readily withdrawn axially from the chamber 2 and from electrical engagement with the bus bar 5.

Thus, the double-bent intermediate portion 15 causes the terminal portion 16 of the clamping leg, when in the disengaged position of FIG. 1A, to be offset from, and generally parallel with, the bus bar 5, whereupon the clamping edge 8 is spaced from to the conductor 4.

In operation, upon progressive insertion of the bare end of insulated conductor 4 into the chamber 2 as shown in FIG. 1C, the end of the conductor engages the clamping leg 7 and displaces the same away from the bus bar 5 toward the engaged position of FIG. 1B, whereupon the clamping leg 7 is angularly arranged relative to the conductor 4, and the clamping edge 8 engages and digs into the outer periphery of the bare end of the conductor, thereby resisting withdrawal of the conductor from the chamber 2. To release the conductor 4 from the bus bar 5, the operating end of the release tool 14 is introduced into the chamber 2 via the second opening 13, whereupon the oblique edge 17 of the release tool engages the surface of the support leg 9 adjacent the support plate 11, thereby to displace juncture 10 toward the bus bar 5, and to deform temporarily the clamping spring 3 to the released position of FIG. 1A. As shown in this figure, the clamping edge portion 7 is thus parallel to the conductor 4, and the offset portion 16 and the clamping edge 8 are parallel with and spaced from the conductor 4, thereby to permit the withdrawal thereof from the housing chamber 2.

If desired, the housing 1 may be of sectional construction including a pair of housing section 1*b* and 1*c* that are either permanently or separately connected.

It is important to note that the clamping tool 14 engages only the support leg 9 of the clamping spring 3, whereby undesirable permanent deformation of the clamping leg 7 is avoided. As will be described in greater detail below, stop means may be provided for limiting the displacement of the juncture 10 toward the bus bar 5, further to prevent permanent distortion of the clamping spring by the release tool 14. Similarly, the diameter of the second opening 13 corresponds generally with the diameter of the operating end portion of the release tool 14, thereby to assure that release tool 14 may be displaced only longitudinally relative to the housing one, whereby undesirable pivotal movement of the release tool, and the resulting permanent deformation of the clamping spring, are avoided.

Figure 2A:
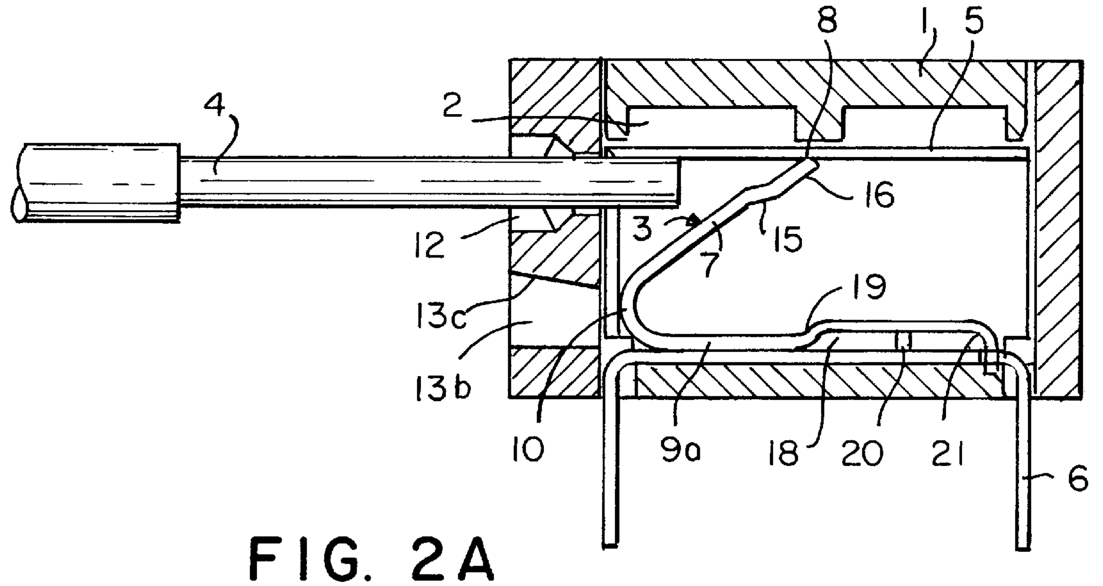
FIGS. 2A and 2B are sectional views of a second embodiment of the invention wherein the clamping spring is in its fully extended and released positions, respectively.
Figure 2B:
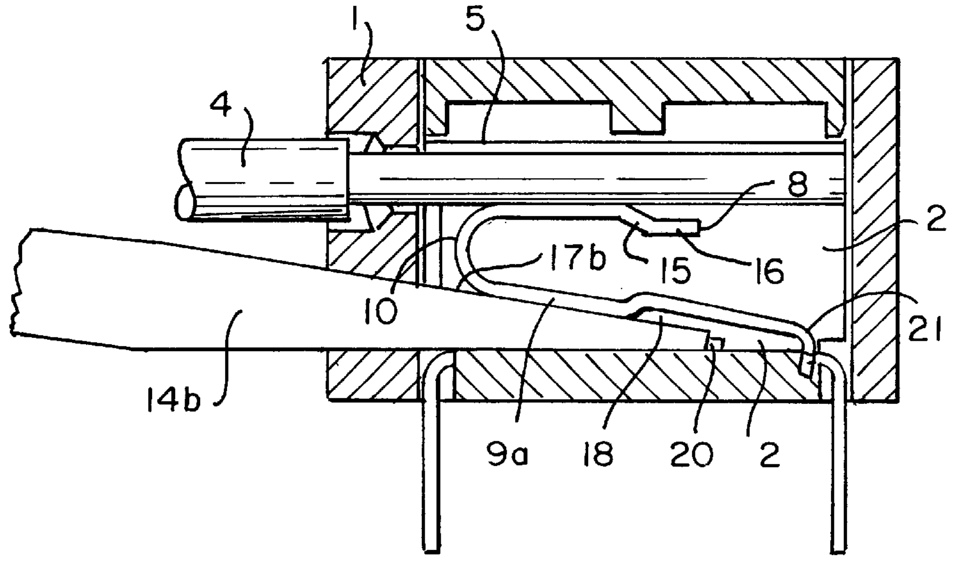

Referring now to the embodiment of FIGS. 2A and 2B, the second housing opening 13*b* is non-circular and includes an inclined wall surface 13*c* the angle of inclination of which corresponds with the operating surface 17*b* of the operating tool 14*b*. In this embodiment, the support leg 9*a* contains a recess 18 defined by a double bent intermediate portion 19, and a an orthogonal end portion 21 that extends within the corresponding recess contained in the housing 1. As shown in FIG. 2, the clamping leg 7 is initially in its fully extended position relative to the bus bar portion 5 of the contact 6. As the conductor 4 is progressively introduced into the housing chamber 2, the clamping leg 7 is progressively displaced toward an engaged position similar to that shown in FIG. 1B, with the clamping edge 8 being partially embedded within the periphery of the bare conductor 4.

To release the conductor from the housing 1 and the bus bar 5, the release tool 14*b*—which may be the end of a standard screwdriver—is introduced within the opening 13*b*, thereby to displace the juncture 10 toward the bus bar 5, and to deform the clamping leg 7 to the released position of FIG. 2A parallel to the bus bar and the conductor 4, thereby causing the terminal portion 16 containing the clamping edge 8 to be spaced from the conductor 4, whereupon the conductor may be axially withdrawn from the chamber 2. It is important to note that in this embodiment, a stationary stop 20 is provided on the housing 1 for limiting the extent of introduction of the release tool 14*b* into the chamber 2, thereby preventing overload displacement of the support leg 9*a* and permanent distortion of the clamping leg 7. In this embodiment, the support leg 9*a* essentially pivots about the end portion 21 at the fulcrum point of its engagement with the housing 1.

Referring now to FIG. 3, the clamping leg 7 is provided with a stop 19 that cooperates with the support portion 9 to limit the degree of pivotal movement of the support leg 9 around the pivot axis 21 thereby to avoid permanent undesirable deformation of the clamping leg portion 7. In this embodiment, the second opening 13*a* has a generally T-shaped configuration, and the working end of the release tool 14*a* has a similar T-shaped cross-sectional configuration, thereby to define stop shoulders 14*b* that limit the extent to which a release tool 14*a* can be introduced within the housing chamber 2. This special profiling prevents an erroneous angular insertion of the release tool 14*a* about its longitudinal axis, and furthermore prevents any possible pivotal movement of the release tool relative to the housing 1, that otherwise could produce an undesirable permanent deformation of the clamping leg relative to the support leg 9.

Referring now to FIG. 4, according to a further embodiment of the invention, the clamping spring 3 includes a plurality of clamping legs 3*b* that are separated by the slits 24, and which are adjoined by a common support leg portion 3*a*. In this embodiment, the various clamping legs 3*b* are each independently operable by a release tool to effect selective withdrawal of the associated conductors 4 from the housing.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. An electrical connector for connecting an electrical conductor with an electrical contact mounted within a chamber contained within a housing formed of electrical insulating material, comprising:

(a) a housing (1) formed of electrical insulating material and containing a chamber (2), said housing containing first (12) and second (13) openings communicating with said chamber, said first opening being operable to receive said electrical conductor;

(b) a stationary electrical contact (5) mounted in said chamber adjacent said first housing opening; and (c) a resilient V-shaped clamping member (3) mounted in said chamber adjacent said second housing opening, said clamping member including:

(1) a support leg (9);

(2) a clamping leg portion (7); and (3) a connecting portion (10) connecting first ends of said support and said clamping leg portions, said clamping member normally having a first condition in which said connecting portion is adjacent said second housing opening, said support leg is supported by a wall portion of said chamber, and said clamping leg is resiliently biased toward said stationary electrical contact;

(4) said clamping leg portion having a second end including:

(a) an offset terminal portion (16) terminating in a clamping edge (8); and (b) an intermediate double-bent portion (15) connecting said terminal portion with said clamping leg portion, said terminal portion being parallel with said clamping leg portion and being laterally offset in the direction of said support leg portion;

(5) said clamping member being so arranged that when a conductor is inserted into said chamber via said first opening toward a position between said electrical contact and said clamping leg portion, said clamping member is operable toward a clamping condition in which said clamping leg portion is angularly arranged relative to said conductor, thereby to bias the conductor toward engagement with said stationary electrical contact, and in which said clamping edge is in retaining engagement with the adjacent surface of the conductor, thereby to retain the conductor within the housing chamber;

(6) said connecting portion being displaceable upon the insertion of a release tool (14) into said second opening toward said stationary contact, thereby to cause said clamping member to have a released condition in which said clamping leg is in parallel engagement with the conductor, in which said terminal portion is parallel with and spaced from the conductor, and in which said clamping edge is disengaged and spaced from the conductor, thereby to permit removal of the conductor from the housing.

2. An electrical connector as defined in claim 1, wherein the cross-section of said second housing opening (13*a*) is non-circular, thereby to receive only a release tool having a corresponding cross-sectional configuration.

3. An electrical connector as defined in claim 2, and further including:

(d) a release tool (14) for displacing said clamping leg from said engaged position toward said released position, said release tool having a non-circular cross-section that corresponds with that of said second opening.

4. An electrical connector as defined in claim 3, wherein said second opening has a T-shaped cross-sectional configuration.

5. An electrical connector as defined in claim 3, and further including stop means limiting the extent of entry of said release tool into said chamber.

6. An electrical connector as defined in claim 5, wherein said stop means includes a stop shoulder (14*b*) provided on said release tool.

7. An electrical connector as defined in claim 5, wherein said stop means includes a stop shoulder (20), provided on said housing.

8. An electrical connector as defined in claim 1 wherein said support leg (9) is arranged opposite said second opening for operation by said release tool to displace said clamping leg to its released position, and further including a support plate (11) arranged between said support leg and the adjacent wall of said housing chamber.

9. An electrical connector as defined in claim 8, wherein said support leg includes intermediate its ends a portion that is offset in the direction of said contact, thereby to define a recess (18) in said support leg.

10. An electrical connector as defined in claim 9, and further including stop means (20) connected with said housing and extending within said support leg recess for limiting the extent of introduction of said release tool into said housing chamber.

11. An electrical connector as defined in claim 1, and further including stop means (19) on said clamping leg for preventing displacement of said clamping leg beyond said clamping position, thereby to limit the degree of deformation of said clamping member.

12. An electrical connector as defined in claim 1, and further including fulcrum means (21) adjacent the free end of said support leg connecting said clamping member for pivot movement relative to said housing.

13. An electrical connector as defined in claim 1, wherein a plurality of said resilient clamping springs are laterally and integrally connected together by their support legs, the clamping legs of said connector being operable independently of each other.

* * * * *